(12) United States Patent
Somasundaram et al.

(10) Patent No.: US 8,483,740 B2
(45) Date of Patent: Jul. 9, 2013

(54) BACKOFF MECHANISM IN RANDOM ACCESS CHANNEL

(75) Inventors: Shankar Somasundaram, Deer Park, NY (US); Ana Lucia Pinheiro, West Chester, PA (US); Charles A. Dennean, Melville, NY (US); Stephen E. Terry, Northport, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 536 days.

(21) Appl. No.: 11/969,293

(22) Filed: Jan. 4, 2008

(65) Prior Publication Data

US 2008/0182609 A1 Jul. 31, 2008

Related U.S. Application Data

(60) Provisional application No. 60/883,690, filed on Jan. 5, 2007, provisional application No. 60/891,786, filed on Feb. 27, 2007.

(51) Int. Cl.
*H04B 7/185* (2006.01)
*H04B 7/00* (2006.01)

(52) U.S. Cl.
USPC .......................................... 455/522; 370/318

(58) Field of Classification Search
USPC .......................................... 455/522; 370/318
See application file for complete search history.

(56) References Cited

U.S. PATENT DOCUMENTS

| | | | |
|---|---|---|---|
| 5,850,525 A * | 12/1998 | Kalkunte et al. | 709/235 |
| 6,163,533 A | 12/2000 | Esmailzadeh et al. | |
| 7,046,653 B2 * | 5/2006 | Nigrin et al. | 370/343 |
| 8,254,316 B2 * | 8/2012 | Chen | 370/329 |
| 2001/0046864 A1 | 11/2001 | Bhatoolaul et al. | |
| 2003/0026324 A1 * | 2/2003 | Li et al. | 375/141 |
| 2004/0218557 A1 * | 11/2004 | Kim et al. | 370/312 |
| 2005/0129058 A1 * | 6/2005 | Casaccia et al. | 370/464 |
| 2005/0154565 A1 * | 7/2005 | Reial | 702/199 |
| 2006/0050742 A1 * | 3/2006 | Grandhi et al. | 370/506 |
| 2006/0111137 A1 * | 5/2006 | Mori et al. | 455/522 |
| 2007/0004423 A1 * | 1/2007 | Gerlach et al. | 455/452.2 |
| 2007/0076807 A1 | 4/2007 | Jin et al. | |
| 2008/0095185 A1 * | 4/2008 | DiGirolamo et al. | 370/464 |
| 2008/0130589 A1 * | 6/2008 | Gorokhov et al. | 370/336 |
| 2010/0272066 A1 * | 10/2010 | Wang et al. | 370/331 |
| 2010/0316096 A1 * | 12/2010 | Adjakple et al. | 375/211 |
| 2010/0329131 A1 * | 12/2010 | Oyman et al. | 370/252 |

OTHER PUBLICATIONS

Siemens "Backoff in LTE", 3GPP TSG-RAN WG2#55, Seoul, South Korea, Oct. 9-13, 2006, R2-062845.

$3^{rd}$ Generation Partnership Project; Technical Specification Group Radio Access Network; "Medium Access Control (MAC) protocol specification"(Release 7) 3GPP TS 25.321 V7.6.0 (Sep. 2007).

Siemens, "Backoff in LTE", 3GPP TSG-RAN WG2#55, Seoul, South Korea, Oct. 9-132006, R2-062845.

(Continued)

*Primary Examiner* — Bobbak Safaipour
(74) *Attorney, Agent, or Firm* — Volpe and Koenig, P.C.

(57) ABSTRACT

A method to determine a back-off adjustment and transmission power adjustment in a wireless transmit/receive unit (WTRU), the method including determining a problem in signal reception and adjusting a back-off and a transmission power based on a plurality of measurement results. The measurement results include common pilot channel received signal code power, received signal strength indicator and uplink interference.

24 Claims, 3 Drawing Sheets

OTHER PUBLICATIONS $3^{rd}$ Generation Partnership Project; Technical Specification Group Radio Access Network; "Medium Access Control (MAC) protocol specification" (Release 7) 3GPP TS 25.321 V7.3.0 (Dec. 2006).

$3^{rd}$ Generation Partnership Project; Technical Specification Group Radio Access Network; "Medium Access Control (MAC) protocol specification" (Release 7) 3GPP TS 25.321 V7.6.0 (Sep. 2007).

Yang et al., "Spatial Backoff Contention Resolution for Wireless Networks," IEEE Workshop on Wireless Mesh Networks, XP03102159, pp. 13-22 (Jan. 1, 2006).

$3^{rd}$ Generation Partnership Project; Technical Specification Group Radio Access Network; "Medium Access Control (MAC) protocol specification" (Release 7), 3GPP TS 25.321 V7.3.0 (Dec. 2006).

$3^{rd}$ Generation Partnership Project; Technical Specification Group Radio Access Network; Medium Access Control (MAC) protocol specification (Release 7), 3GPP TS 25.321 V7.6.0 (Sep. 2007).

$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 3GPP TS 36.300 V0.3.1 (Nov. 2006).

$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 3GPP TS 36.300 V8.3.0 (Dec. 2007).

Siemens, "Backoff in LTE", 3GPP TSG-RAN WG2#55, Seoul, South Korea, Oct. 9-13, 2006, R2-062845.

\* cited by examiner

BACKOFF MECHANISM IN RANDOM ACCESS CHANNEL

CROSS REFERENCE TO RELATED APPLICATIONS

This application claims the benefit of U.S. provisional application No. 60/883,690 filed Jan. 5, 2007 and U.S. provisional application No. 60/891,786 filed Feb. 27, 2007, which are incorporated by reference as if fully set forth.

FIELD OF INVENTION

The present invention relates to wireless communication.

BACKGROUND

The Third Generation Partnership Project (3GPP) has initiated the Long Term Evolution (LTE) program to bring new technology, new network architecture and configurations and new applications and services to wireless communication networks in order to provide improved spectral efficiency, reduced latency, faster user experiences and richer applications and services with less cost. One goal of the LTE program is to develop an E-UTRAN (Evolved Universal Terrestrial Radio Access Network).

When a wireless transmit receive unit (WTRU) makes uplink transmissions in an E-UTRAN during initial call establishment, and whenever there are no allocated dedicated channels or shared channels, the WTRU accesses the network by using a random access channel (RACH). WTRUs apply different backoff mechanisms before utilizing RACH resources. Backoff may be applied before each access attempt, including reattempts following access failure. A WTRU may identify an access class and read a system information block (SIB) which it uses to calculate its backoff delay. Further, the network may dynamically signal a probability factor in a SIB.

A WTRU may infer that reception of a preamble negative acknowledgement (NACK) signal indicates a failure due to a collision. A WTRU may also infer that no preamble response indicates a failure due to interference or poor signal-to-interference ratio (SIR). Based on this inference, the WTRU may alter a backoff value for retransmitting RACH preambles. However, the inference is not reliable. If detection of an overload condition versus a case of poor SIR can be improved, a better decision regarding a backoff factor can be made by the WTRU.

SUMMARY

A method and apparatus are disclosed to determine a back-off adjustment and transmission power adjustment in a wireless transmit/receive unit (WTRU). The method includes the WTRU determining a problem in signal reception, making measurements, such as common pilot channel (CIPCH) received signal code power (RSCP) and received signal strength indicator (RSSI) for example, receiving measurements from an eNB, such as uplink (UL) interference, for example, and adjusting back-off and transmission power based on the measurements.

BRIEF DESCRIPTION OF THE DRAWINGS

A more detailed understanding may be had from the following description, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to an e Node-B, a site controller, an access point (AP), or any other type of interfacing device capable of operating in a wireless environment.

Figure 1:
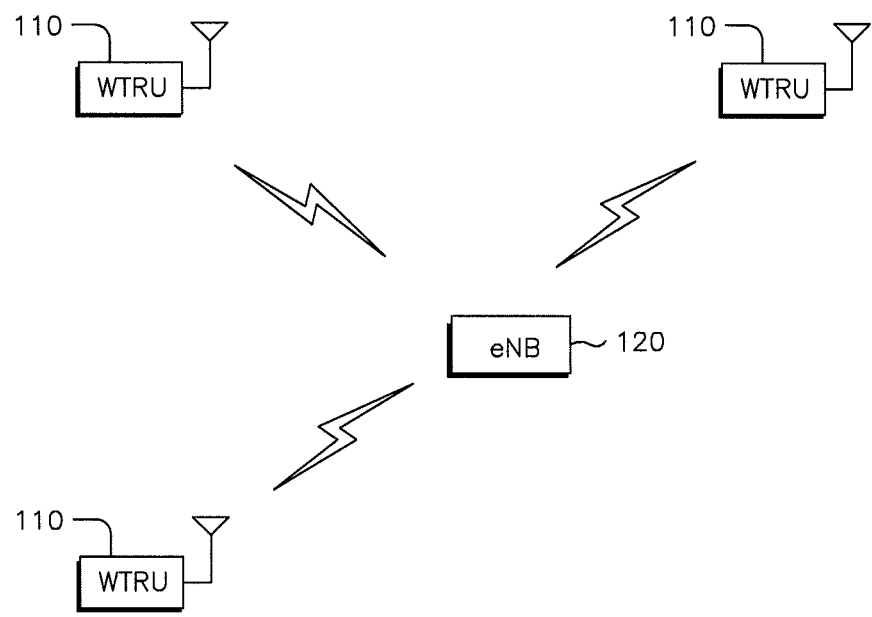
FIG. 1 shows a wireless communications system in accordance with one embodiment.

FIG. 1 shows a wireless communication system 100 in accordance with one embodiment. The system 100 includes a plurality of WTRUs 110 and an eNB 120. As shown in FIG. 1, the WTRUs 110 are in communication with the eNB 120. Although three WTRUs 110 and one eNB 120 are shown in FIG. 1, it should be noted that any combination of wireless and wired devices may be included in the wireless communication system 100.

Figure 2:
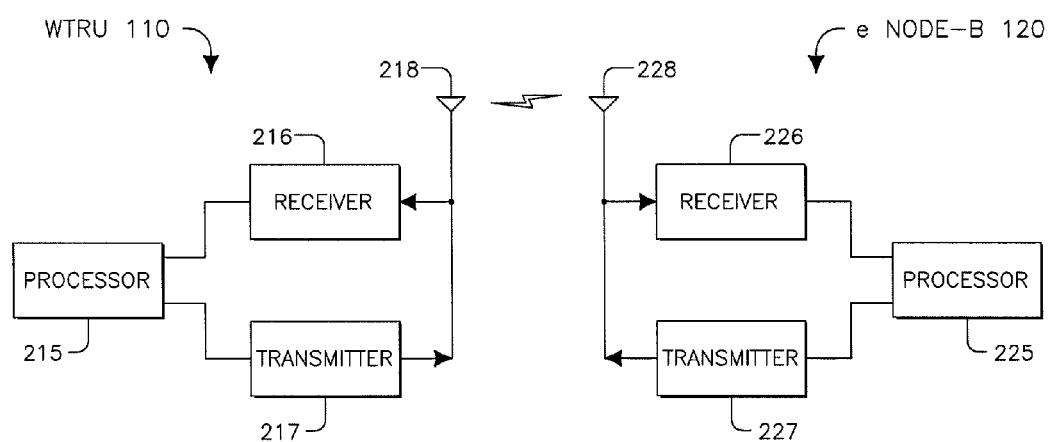
FIG. 2 is a functional block diagram of a WTRU and an e Node B (eNB) in accordance with one embodiment.

FIG. 2 is a functional block diagram 200 of a WTRU 110 and the eNB 120 of the wireless communication system 100 of FIG. 1. As shown in FIG. 1, the WTRU 110 is in communication with the eNB 120 and both are configured to perform a method of adaptive sequence numbering.

In addition to the components that may be found in a typical WTRU, the WTRU 110 includes a processor 215, a receiver 216, a transmitter 217, and an antenna 218. The processor 215 may be configured to perform a procedure to determine back-off and power levels. The receiver 216 and the transmitter 217 are in communication with the processor 215. The antenna 218 is in communication with both the receiver 216 and the transmitter 217 to facilitate the transmission and reception of wireless data.

In addition to the components that may be found in a typical eNB 120, the eNB 120 includes a processor 225, a receiver 226, a transmitter 227, and an antenna 228. The processor 225 is configured to perform, inter alia, measurements and a procedure to determine backoff and transmission power levels. The receiver 226 and the transmitter 227 are in communication with the processor 225. The antenna 228 is in communication with both the receiver 226 and the transmitter 227 to facilitate the transmission and reception of wireless data.

The WTRU 110 may make various measurements of a received signal. One measurement the WTRU 110 may make is Common Pilot Channel Received Signal Code Power (CPICH RSCP). CPICH RSCP is a measure of CPICH code power at the WTRU 110. More specifically, CPICH RSCP is the received power on one code after despreading by the WTRU 110 on pilot bits on a given channel.

Another measurement the WTRU 110 can make is the Received Signal Strength Indicator (RSSI). The RSSI is the total received power measured at the WTRU receiver 216, and is an indicator of downlink interference.

TABLE 1 shows a list of possible scenarios based on combinations of detected CPICH RSCP, Uplink (UL) interference, as received from the eNB 120, Downlink (DL) interference based on WTRU 120 measured RSSI, the WTRU 120 distance from the eNB 120, and whether the WTRU is in deep fade.

UL interference is measured at the eNB 120 and takes into account the presence of other WTRUs in the cell. The only parameter that the WTRU 110 needs from the eNB 120 is UL interference. UL interference values are typically transmitted to the WTRU 110 in broadcast system information. RSCP, RSSI, and other parameters may be measured by the WTRU 110. Thus, with the assistance from the eNB 120, the WTRU 110 can determine whether it is in a deep fade, has poor SIR or whether there is interference from other WTRUs. It can further determine whether it is near the eNB 120 or at a cell edge. Measurements can be made to determine the thresholds for all the quantities.

For example, in scenario 1, the WTRU 110 is near the eNB 120, there is no interference and no deep fade, the CPICH RSCP is high, the UL interference is low and the RSSI is low. By way of another example, in scenario 6, there is interference on both the DL and the UL, the WTRU 110 is in deep fade, and is near the eNB 120. The CPICH RSCP is low, the UL interference is high and the downlink interference is high.

WTRU's not receiving a system information block (SIB) on the DL. Therefore, power is raised and backoff is not increased.

In scenarios 7 and 11, the UL interference is high. The eNB may not properly receive the UL signal due to noise or interference. However, on the DL, since the DL interference (RSSI-RSCP) is low, there is no noise. But with a low RSCP, the SIB may not have not reached the WTRU. With the probabilities of collision or noise on the UL or the DL being almost equal, it is unclear whether the problem a collision. Therefore, back-off is set to a medium value and power is raised by a high value since the WTRU may be on a cell edge.

In scenario 1, when the UL interference is low, there is no noise or interference on the UL. With the RSCP high and RSSI low, DL conditions may be good, with high RSCP and low DL interference. It is therefore likely that the only reason for the WTRU 110 to not properly receive an eNB 120 signal may be a random collision on the UL. Hence the back-off is set to a higher value but power is not raised.

In scenario 3, and similarly in scenario 2, the UL interference is high. Therefore, the probability that the eNB 120 may not receive a signal from the WTRU 110 due to noise is

TABLE 1

| Scenario | WTRU Location | Interference | Deep Fade | CPICH RSCP | UL (Uplink) Interference | DL (Downlink) Interference (RSSI-RSCP) |
|---|---|---|---|---|---|---|
| 1 | Near cell | No | No | High | Low | Low |
| 2 | | UL + DL | No | High | High | High |
| 3 | | UL only | No | High | High | Low |
| 4 | | DL only | No | High | Low | High |
| 5 | | No | Yes | Low | Low | Low |
| 6 | | UL + DL | Yes | Low | High | High |
| 7 | | UL only | Yes | Low | High | Low |
| 8 | | DL only | Yes | Low | Low | High |
| 9 | Cell edge | No | D/C | Low | Low | Low |
| 10 | | UL + DL | D/C | Low | High | High |
| 11 | | UL only | D/C | Low | High | Low |
| 12 | | DL only | D/C | Low | Low | High |

TABLE 2 associates the 12 scenarios of TABLE 1 with particular adjustments to back-off levels and transmission power. In each of the scenarios, the WTRU 110 has not properly received a particular system information block (SIB) from the eNB 120, indicating problems on the DL and/or the UL.

approximately equal to the probability that interference is a problem. DL conditions appear very good, with high RSCP and low DL interference. Therefore, back-off is set to a medium value and power is raised to a medium value. This may counter the effect of both noise and interference on the UL.

TABLE 2

| Scenarios | CPICH RSCP | UL Interference [From SIB 7] | DL interference (RSSI-RSCP) | Collision likely | Backoff Level | Delta Power |
|---|---|---|---|---|---|---|
| 5, 9 | Low | Low | Low | No | Low | High |
| 7, 11 | Low | High | Low | Not sure | Medium | High |
| 1 | High | Low | Low | Yes | High | Low |
| 3 | High | High | Low | Not sure | Medium | Medium |
| 8, 12 | Low | Low | High | No | Low | High |
| 6, 10 | Low | High | High | No | Medium | High |
| 4 | High | Low | High | No | Low | Low |
| 2 | High | High | High | Not sure | Medium | Medium |

As shown in TABLE 2, in scenarios 5 and 9, and similarly for scenarios 8 and 12, for example, when the UL interference is low, there is no noise or interference on the UL. When combined with a low RSCP, this may indicate that the WTRU 110 is near a cell edge or in a deep fade. Therefore, the most likely cause of no response from the WTRU 110 is the In scenarios 6 and 10, the interference is high. Therefore, the eNB 120 may not have received the signal from the WTRU 110 due to noise or interference. Also, DL conditions appear poor since RSCP is low and DL interference is high. Therefore, due to poor channel conditions on the UL and DL, it is likely that the WTRU did not receive a response from the eNB 120. While collision is probably not a problem, there is a small probability of a collision on the UL. Therefore, the WTRU 110 should adjust the back-off to a medium value and raise its power to a higher value to compensate for the poor channel conditions.

In scenario 4, the UL interference is low. There is no noise or interference on UL. Since RSCP is high, the WTRU 110 may be near the eNB 120. However, the DL interference is high and the WTRU 110 is measuring a lot of noise. It is therefore likely that DL noise might be the main reason for the WTRU 110 not detecting the proper SIB. Therefore, back-off should be adjusted to a low value. Raising the power, however, may not help, as an increase in power for the WTRU 110 does not necessarily combat the DL noise.

In the scenarios in which transmission power is adjusted, the power may be set to a fixed number for high, medium and low settings. Alternatively, the power adjustment may be incremental. If collision is identified as a problem the WTRU may employ a frequency hopping methodology by switching the random access channel (RACH) frequency for a retransmission.

Figure 3:
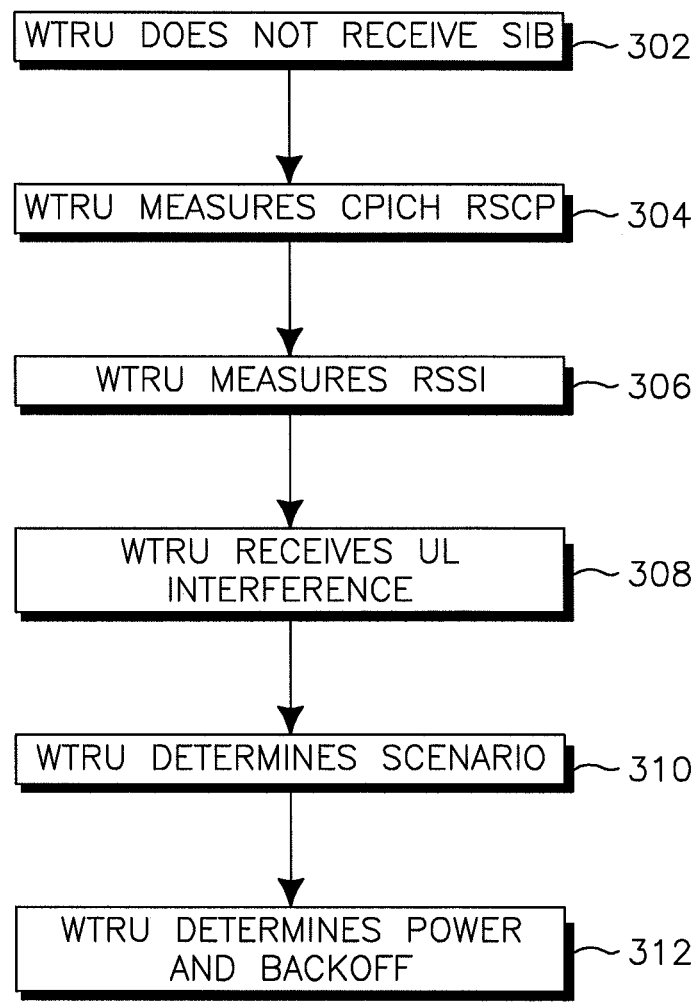
FIG. 3 is a flow diagram of a method to determine back-off in accordance with one embodiment.

FIG. 3 is a flow chart of a method of back-off and power level control 300 in accordance with one embodiment. In step 302 a WTRU measures CIPCH RSCP. At step 304, the WTRU measures RSSI. At step 306, the WTRU receives UL interference information from the eNB. Once the measurements are completed, the WTRU, at step 308, may determine which scenario, based on TABLE 1, the WTRU is in. The WTRU, at step 310, based on the scenario and the scenario's associated action plan, adjusts back-off and power level accordingly.

As an alternative, the WTRU may use other measurement values to determine back-off and power levels. For example, cell load or channel quality indicator (CQI) may be used along with, or instead of, RSSI and CPICH RSCP. If a measure is supplied by the eNB, it can be transmitted to the WTRU in a broadcast channel (BCH) transmission.

As another alternative, the eNB may determine back-off levels and power levels instead of the WTRU. The WTRU may report the relevant measurements to the eNB and, after determining the proper power levels and back-off the eNB may use a BCH, for example, to transmit the information to the WTRU. This may be done for each individual WTRU in a cell, for a set of WTRUs, or for all WTRUs in a cell.

Although the features and elements are described in embodiments in particular combinations, each feature or element can be used alone without the other features and elements of the embodiments or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method to determine a back-off delay adjustment and transmission power adjustment in a wireless transmit/receive unit (WTRU) the method comprising:
   receiving a NACK indicating a problem in signal reception of an uplink transmission from the WTRU to a base station;
   obtaining measurement results from a base station's measurements of the WTRU's uplink signal including uplink interference from other WTRUs;
   determining whether the WTRU is in deep fade, and whether the WTRU is near the base station or at a cell edge of the base station, based on the WTRU's measurements of a received signal by the WTRU;
   determining a likelihood that the problem in signal reception is in response to transmission collision, or uplink interference, or both based on the base station's measurements and the WTRU's measurements; and
   adjusting back-off delay and transmission power based on the determined likelihood of collision, uplink interference, or both.

2. The method as in claim 1 wherein obtaining measurement results includes measuring a plurality of variables to create the plurality of measurement results.

3. The method as in claim 1 wherein obtaining measurement results includes receiving the measurement results from an eNB.

4. The method as in claim 1 wherein the measurement results further include a common pilot channel (CPICH) received signal code power (RSCP) and a received signal strength indicator (RSSI).

5. The method as in claim 1 wherein the measurement results further include a distance to the eNB.

6. The method as in claim 4 further comprising determining whether the CPICH RSCP, RSSI and UL interference is high or low.

7. The method as in claim 6 further comprising raising transmission power and not adjusting back-off delay on a condition that:
   UL interference is low;
   CPICH RSCP is low; and
   RSSI is low.

8. The method as in claim 6 further comprising setting back-off delay to a medium value and raising power by a high value on a condition that:
   UL interference is high;
   CPICH RSCP is low; and
   RSSI is low.

9. The method as in claim 6 further comprising setting back-off delay to a higher value and not adjusting power on a condition that:
UL interference is low;
CPICH RSCP is high; and
RSSI is low.

10. The method as in claim 6 further comprising setting back-off delay to a medium value and adjusting power by a medium value on a condition that:
UL interference is high;
CPICH RSCP is high; and
RSSI is low.

11. The method as in claim 6 further comprising setting back-off delay to a low value and adjusting power by a high value on a condition that:
UL interference is low;
CPICH RSCP is low; and
RSSI is high.

12. The method as in claim 6 further comprising setting back-off delay to a medium value and adjusting power by a high value on a condition that:
UL interference is high;
CPICH RSCP is low; and
RSSI is high.

13. The method as in claim 6 further comprising setting back-off delay to a low value and not adjusting power on a condition that:
UL interference is low;
CPICH RSCP is high; and
RSSI is high.

14. The method as in claim 6 further comprising setting back-off delay to a medium value and adjusting power by a medium value on a condition that:
UL interference is high;
CPICH RSCP is high; and
RSSI is high.

15. The method as in claim 1 further comprising:
detecting a collision; and
switching a random access channel (RACH) frequency.

16. The method as in claim 1 wherein the measurement results comprises a cell load value and a channel quality index (CQI).

17. The method as in claim 1 further comprising:
receiving back-off delay and transmission power level adjustments based on the transmitted plurality of measurements.

18. A method of an eNodeB (eNB) setting a back-off delay and transmission power of a wireless transmit/receive unit (WTRU), the method comprising:
receiving a plurality of WTRU measurements related to whether the WTRU is in deep fade, and whether the WTRU is near the base station or at a cell edge of the base station;
measuring an uplink (UL) interference value for the WTRU based on uplink interference from other WTRUs;
determining a likelihood that the problem in signal reception is in response to transmission collision, or uplink interference, or both based on the plurality of WTRU measurements and the UL interference value;
determining the back-off delay and transmission power of the WTRU based on the determined likelihood of collision, uplink interference, or both; and
transmitting a back-off delay and transmission power adjustment to the WTRU.

19. The method as in claim 18 wherein the plurality of WTRU measurements comprises a Common Pilot Channel (CIPCH) received signal code power (RSCP) value and a received signal strength indicator (RSSI) value.

20. A method of setting a back-off delay and a transmission power of a wireless transmit/receive unit (WTRU) comprising:
determining a likelihood that the problem in signal reception is in response to transmission collision, or uplink interference, or both, based on:
detecting a level of a Common Pilot Channel Received Signal Code Power (CPICH RSCP), said CPICH RSCP level being either high or low;
receiving a measurement result for a detected level of an Uplink (UL) interference from a base station's measurements of the WTRU's uplink signal including uplink interference from other WTRUs, the UL interference level being either high or low;
detecting a level of a Downlink (DL) interference said DL interference level being either high or low; and
determining whether the WTRU is in deep fade, and whether the WTRU is near the base station or at a cell edge of the base station, based on the WTRU's measurements of a received signal by the WTRU; and
setting the back-off delay and the transmission power based on the determined likelihood of collision, uplink interference, or both.

21. The method as in claim 20 wherein the back-off delay is set to a low back-off delay, a medium back-off delay, or a high back-off delay, and the transmission power is set to a low power level, a medium power level or a high power level.

22. A wireless transmit receive unit (WTRU) comprising:
a receiver configured to receive a measured uplink interference value from a base station's measurements of the WTRU's uplink signal including uplink interference from other WTRUs;
a processor configured to:
determine a problem in signal reception of an uplink transmission from the WTRU to a base station;
determine a plurality of measurement results, including determining whether the WTRU is in deep fade, and whether the WTRU is near the base station or at a cell edge of the base station, based on the WTRU's measurements of a received signal by the WTRU;
determining a likelihood that the problem in signal reception is in response to transmission collision, or uplink interference, or both based on the received uplink interference value and the plurality of measurement results in response to the problem in signal reception; and
adjusting back-off delay and transmission power based on the determined likelihood of collision, uplink interference, or both.

23. The WTRU as in claim 22 wherein the plurality of measurement results comprises:
a common pilot channel (CIPCH) received signal code power (RSCP) value; and
a received signal strength indicator (RSSI) value.

24. The WTRU as in claim 22 wherein the processor is further configured to determine cell distance and fade status.

* * * * *